Aug. 29, 1967   D. H. YOUDEN   3,338,106
POWER TRANSMISSION APPARATUS
Filed Sept. 7, 1965   2 Sheets-Sheet 1

David H. Youden
INVENTOR

BY *Norman S. Blodgett*
ATTORNEY

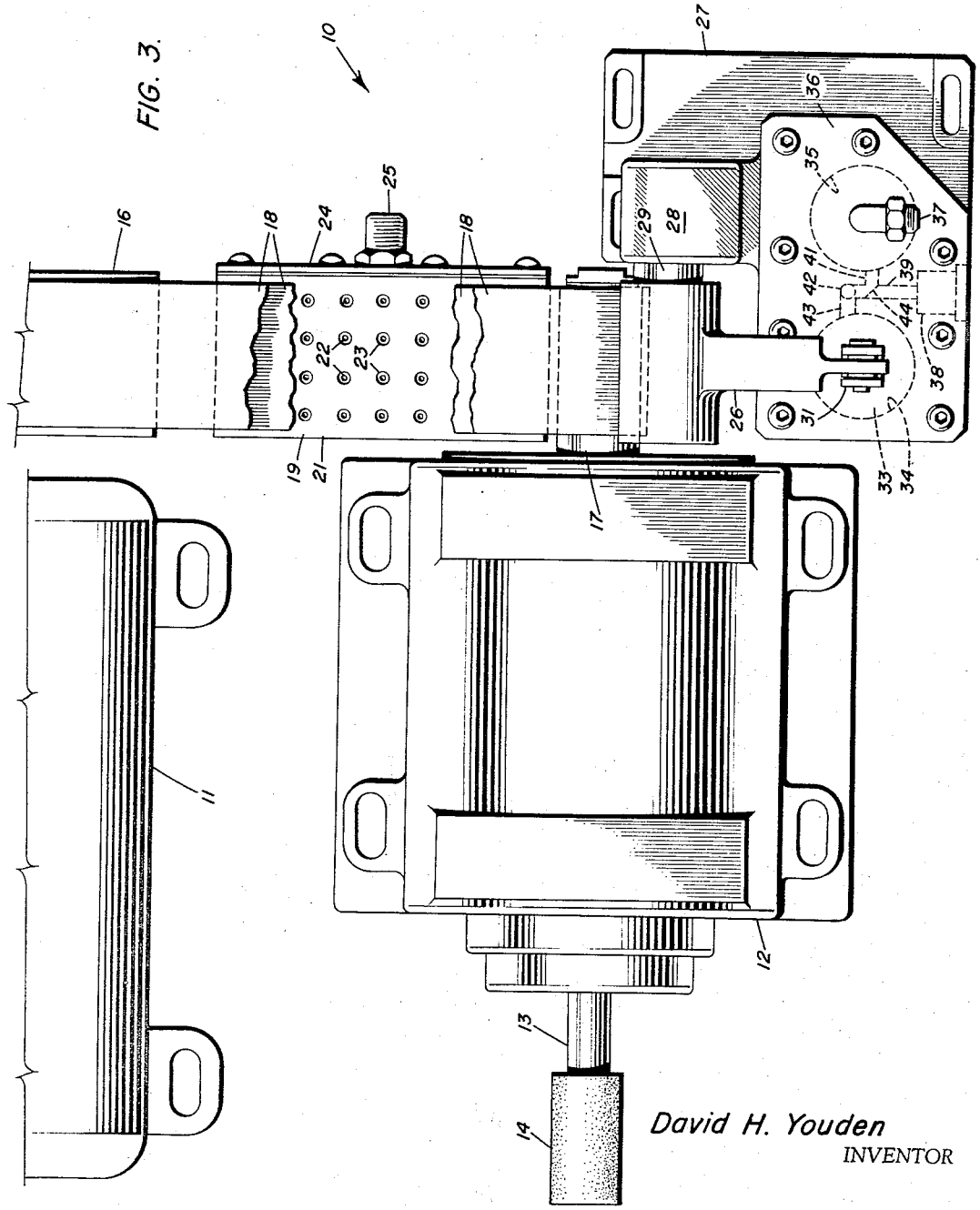

United States Patent Office 3,338,106
Patented Aug. 29, 1967

---

3,338,106
POWER TRANSMISSION APPARATUS
David H. Youden, Worcester, Mass., assignor to The Heald Machine Company, Worcester, Mass., a corporation of Delaware
Filed Sept. 7, 1965, Ser. No. 485,394
11 Claims. (Cl. 74—227)

This invention relates to a power transmission apparatus and, more particularly, to apparatus arranged to provide a belt drive between a driving and a driven pulley.

In the application of a belt drive to a machine, such as a machine tool, a pulley on a drive motor is connected by a belt to a pulley on a spindle, such as the spindle of an abrasive wheelhead. Unfortunately, it is not possible to adjust the center distances of these two wheels, from time to time, and, for that reason, it has been common practice to provide an idler wheel contacting the belt between the two wheels and maintaining by spring pressure of the idler a constant tension in the belt. However, such idler wheels are subjected to considerable wear by the belt. Furthermore, they carry considerable pressure and, at the same time, have bearings which permit movement of the idler pulley, which bearing breaks down rather readily. Of course, the driving action of the belt across the idler wheel also causes belt wear. These and other difficulties experienced with the prior art devices have been obviated in a novel manner by the present invention.

It is, therefore, an outstanding object of the invention to provide a power transmission apparatus including a belt and an idler wherein the idler is not subjected to wear.

Another object of this invention is the provision of a power transmission apparatus, including a driving wheel and a driven wheel joined by a belt, wherein belt tension is maintained at a constant value without wear to the belt due to contact with an idler wheel.

A further object of the present invention is the provision of a power transmission apparatus, including a belt drive which is relatively free of wear and maintenance problems and which is capable of a long life of useful service.

It is another object of the instant invention to provide a power transmission apparatus having a belt drive wherein air pressure is used to maintain the belt tension at a constant value.

With these and other objects in view, as will be apparent to those skilled in the art, the invention resides in the combination of parts set forth in the specification and covered by the claims appended hereto.

Figure 1:
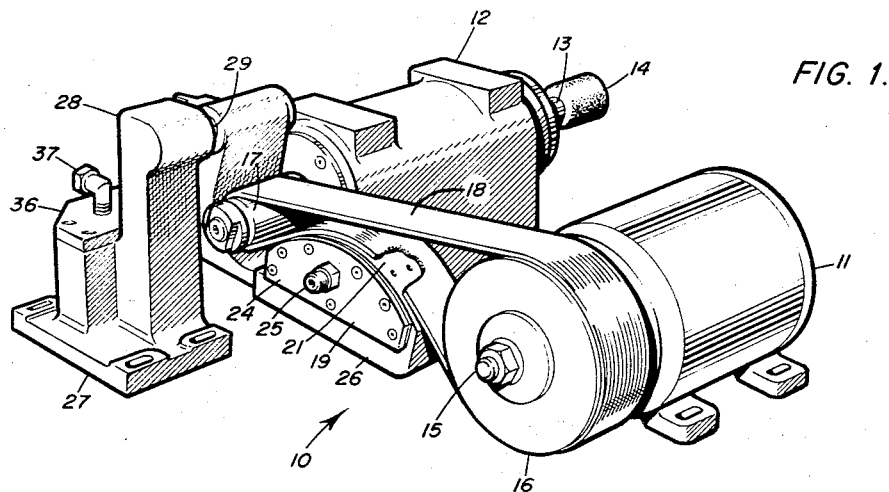
Figure 2:
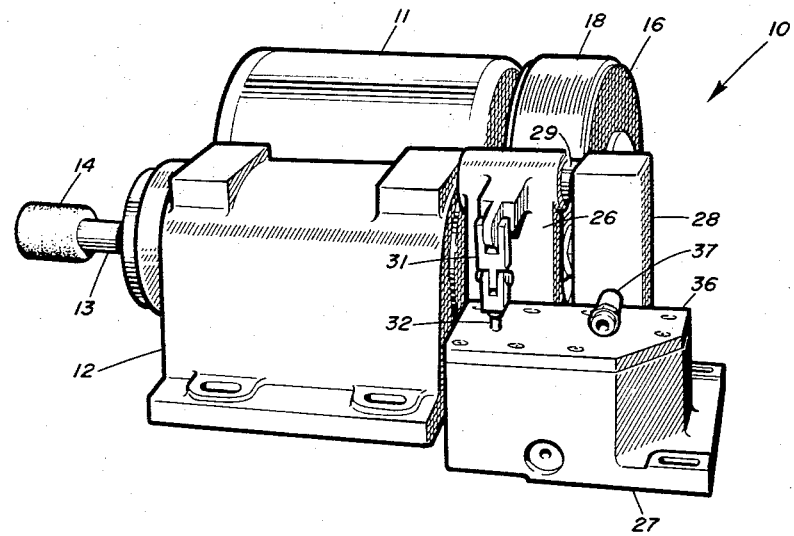

The character of the invention, however, may be best understood by reference to one of its structural forms as illustrated by the accompanying drawings in which:

FIG. 1 is a perspective view of power transmission apparatus embodying the principles of the present invention, FIG. 2 is a perspective view of the apparatus taken from one side, and FIG. 3 is a plan view of the apparatus.

Referring to the drawings, it can be seen that the power transmission apparatus, indicated generally by the reference numeral 10, is shown connecting a motor 11 to the wheelhead 12 of a machine tool, such as a grinding machine. For the purpose of description, the wheelhead 12 is provided with a spindle 13, on the outer end of which is mounted an abrasive wheel 14. The motor 11 has a shaft 15 on which is mounted a large driving wheel or pulley 16. Similarly, the shaft 13 protrudes from the rear end of the wheelhead 12 and on it is mounted a small driving wheel or pulley 17. The axes of the pulleys 16 and 17 are spaced and parallel and the wheels are joined by a flat belt 18. Pressing against the belt between the wheel 16 and the wheel 17 is an idler 19. The idler has a curved surface 21 which, in the preferred embodiment, is a segment of a cylinder; this surface is provided with a plurality of apertures 22, each aperture being provided with a shallow counterbore 23. The idler is hollow and access to the interior is provided by a plate 24 from which extends a connecting fitting 25 adapted to be joined to a source of air under pressure.

The idler 19 is mounted on one end of a lever 26 which is pivotally mounted in its central portion on a base 27. The base 27 is provided with a tall abutment 28 from which extends a horizontal pivot pin 29 on which the lever 26 is mounted.

The other end of the lever 26 is pivotally connected to a bifurcated fitting 31, the lower end of which is connected to the bifurcated upper end of a piston rod 32. The rod 32 is connected, in turn, to a piston 33 slidable in a vertical bore 34 formed in the base 27. Formed in the base 27 and spaced from the bore 34 is an additional vertical bore 35 of somewhat the same size. Overlying the base and covering the tops of the bores 34 and 35 is a cover 36. An aperture in the cover provides for the admission of the piston 32, while the portion of the cover overlying the bore 35 is provided with an air fitting 37. Entering the base between the two bores 34 and 35 is a bore 38 leading into a smaller bore 39. Intersecting the bore 39 is a similar passage 41 leading at a right angle from the bottom of the reservoir formed by the bore 35. The bore 39 continues beyond the passage 41 to a connection with a vertical passage 42 at the top of which is connected a horizontal passage 43 leading to the top of the cylinder formed by the bore 34. Lying in the passage 39 is a restrictor member 44 having a large cylindrical head which fits snugly in the bore 38 and having a small stem fitting in the bore 39. The inner end of the stem is cut at a 45° angle, so that rotation of the restrictor member 44 permits the end to cut off the passage 41, if desired.

The operation of the apparatus will now be readily understood in view of the above description. With the motor 11 operating, the shaft 15 and the wheel 16 also rotate. This moves the belt 18 which, in turn, passes over the driving pulley 17 which rotates the spindle 13 in the wheelhead 12. When this is done, machine work may be performed by the abrasive wheel 14 or its equivalent work-absorbing element. At the same time, the lower run of the belt 18 passes over the idler 19. Air under pressure is introduced into the fitting 25 so that the hollow interior of the idler is provided with air under pressure. This air leaves the chamber through the apertures 22 and their counter-bores 23. Although the belt 18 attempts to make contact with the surface 21 of the idler 19, the flow of air through the apertures 22 causes a layer of air to flow from the apertures in all directions to the outside of the belt 18 where it escapes. Now, such a film of air is brought about by the hydrostatic pressure of the air as well as a certain degree of hydrodynamic lift caused by the motion of the belt 18 relative to the surface 21. In any case, the belt does not touch the idler and yet the belt is subjected to the lateral forces necessary to maintain the belt tension at its optimum value. In order to maintain the belt tension at this value, the lever 26 on which the idler 19 is mounted is pivoted about its pivot pin 29. This is done by providing the reservoir formed by the bore 35 with a supply of oil. This oil resides throughout all of the passages of the head except the top of the reservoir formed by the bore 35. Pressure air is supplied to the fitting 37 on occasion and this forces the hydraulic fluid downwardly in the reservoir and brings about pressure oil in the bore 34 which serves to push the piston associated with the piston rod 32 downwardly. This downward motion operates through the fitting 31 and the end of the lever 26 opposite the end to which the idler 19 is attached. The downward motion of this end causes the upward motion of the other end and the idler is brought in proximity to the belt 18. The force with which the idler presses the belt to maintain belt tension is determined by the oil pressure in the bore 34 which, in turn, is proportional to the air pressure presented to the fitting 37 at the top of the bore 35. Normally, when the motor 11 is not operating, air pressure is removed from the fitting 37 and the idler 19 forces the piston upwardly in the bore 34 and causes the oil to flow over into the reservoir formed by the bore 35. Even when the motor is started up again, it is not desirable to bring the idler into direct contact with the belt. It is desirable to permit the belt tension to be raised to the desired value after the motor 11 has reached its operating speed. For that reason, the restrictor member 44 is provided to impede the flow of oil from the bore 35 to the bore 34. In that way, the restrictor member from the nature of its angularly-cut end can determine the size of the opening in the corner formed by the intersection of the passage 41 with the bore 39. When air pressure is on the fitting 37 it presses on the oil in the bore 35 pushing it downwardly and pressing it through the passage 41. Eventually, it reaches the bore 39, but the amount of flow is determined by the restrictor member 44 and passes into the rearwardly-directed portion of the bore 39. The oil then passes into the vertical passage 42 and from the top of that passage to the horizontal passage 43 from which it passes to the top of the bore 34 to operate the piston.

It can be seen, then, that the belt 18 does not make physical contact with the idler and, therefore, cannot wear. Furthermore, there are no moving parts in the idler that would be constantly rotated and moved, as in the prior art devices. This should permit the idler to operate for a long life of useful service. The idler surface 21 does not wear because there is always a layer of air between it and the belt. The belt itself, of course, does not wear for the same reason. At the same time, the pressure of the idler against the belt can be maintained at a desired value within very close limits.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Power transmission apparatus, comprising
    (a) a driving wheel,
    (b) a driven wheel,
    (c) an endless belt extending around the two wheels, and
    (d) an idler operating on the belt between the two wheels, the idler having a curved surface around which the belt passes and having openings through which air passes to separate the belt from the surface.

2. Power transmission apparatus, comprising
    (a) a driving wheel,
    (b) a driven wheel, the two wheels having spaced parallel axes and being adapted to receive an endless belt passing around them,
    (c) an idler mounted between the wheels and having a curved surface around which the belt passes, there being a plurality of apertures opening on the surface, and
    (d) means providing air under pressure to the idler to pass through the apertures and provide a flow of air between the said surface and the belt.

3. Power transmission apparatus as recited in claim 2, wherein means is provided to bias the idler toward the belt transversely of a line joining the axes of the wheels.

4. Power transmission apparatus as recited in claim 2, wherein the idler is hollow to receive the air under pressure and wherein each aperture is provided with a relatively large counterbore opening onto the said surface.

5. Power transmission apparatus as recited in claim 2, wherein the idler is mounted on a pivoted lever, which lever is subjected to a biasing force to press the idler toward contact with the belt.

6. Power transmission apparatus as recited in claim 5, wherein the lever is pivotally mounted at its center, wherein the idler is mounted at one end, and wherein the biasing force is provided by an actuator acting at the other end.

7. Power transmission apparatus as recited in claim 6, wherein the actuator comprises a hydraulic cylinder and piston receiving hydraulic fluid from a reservoir, the fluid in the reservoir being subjected to air pressure to bring about motion of the piston in the cylinder and movement of the idler toward the belt.

8. Power transmission apparatus as recited in claim 7, wherein a passage connects the reservoir to the cylinder, the passage including a right angle intersection of two cylindrical passages, and wherein a restrictor member lies in one of the cylindrical passages adjacent the said intersection and has an angular end lying in the intersection to restrict the flow of fluid through the intersection.

9. Power transmission apparatus, comprising
    (a) a driving wheel,
    (b) a driven wheel, the two wheels having spaced parallel axes and being adapted to receive an endless belt passing around them,
    (c) an idler mounted between the wheels and having a curved surface around which the belt passes, there being a plurality of apertures opening on the surface, the idler being mounted on a pivoted lever, which lever is subject to a biasing force to press the idler toward contact with the belt, the idler being hollow to receive air under pressure and each aperture being provided with a relatively large counterbore opening onto the said surface,
    (d) means providing air under pressure to the idler to pass through the apertures and to provide a flow of air between the said surface and the belt, and
    (e) an actuator providing the said biasing force on the pivoted lever, the actuator comprising a hydraulic cylinder and piston receiving hydraulic fluid from that reservoir, the fluid in the reservoir being subjected to air pressure to bring about motion of the piston in the cylinder and movement of the idler toward the belt.

10. Power transmission apparatus as recited in claim 9, wherein the lever is pivotally mounted at its center, wherein the idler is mounted at one end, and wherein the biasing force is provided by an actuator acting at the other end.

11. Power transmission apparatus as recited in claim 9, wherein a passage connects the reservoir to the cylinder, the passage including a right-angle intersection of two cylindrical passages, and wherein a restrictor member lies in one of the cylindrical passages adjacent the said intersection and has an angular end lying in the intersection to regulate the flow of fluid through the intersection.

References Cited

UNITED STATES PATENTS

| | | | |
|---|---|---|---|
| 1,385,396 | 7/1921 | Rayburn | 74—230.6 |
| 1,988,421 | 1/1935 | McCann et al. | 74—242.11 |
| 2,221,585 | 11/1940 | Klein et al. | 74—242.11 |
| 3,119,140 | 1/1964 | Sallet | 74—230.6 X |
| 3,132,596 | 5/1964 | Dinger | 74—242.11 X |

FRED C. MATTERN, JR., Primary Examiner.

J. A. WONG, Assistant Examiner.